United States Patent [19]

Roellchen

[11] 4,435,463

[45] Mar. 6, 1984

[54] SUPPORTING AND SPACING MEMBER FOR WEB MATERIAL ROLLS

[75] Inventor: Thomas A. Roellchen, Almena Township, Van Buren County, Mich.

[73] Assignee: Ace Polymers, Inc., Kalamazoo, Mich.

[21] Appl. No.: 385,360

[22] Filed: Jun. 7, 1982

Related U.S. Application Data

[63] Continuation-in-part of Ser. No. 235,827, Feb. 19, 1981, Pat. No. 4,385,091.

[51] Int. Cl.³ .................. B32B 3/26; B65D 85/67; B65D 85/62
[52] U.S. Cl. .................. 428/158; 108/901; 206/391; 206/386; 206/821; 428/156; 428/167; 428/174; 428/188; 428/192
[58] Field of Search ............... 428/156, 158, 188, 131, 428/192, 167, 174; 108/901, 51.1; 248/346; 206/821, 386, 391

[56] References Cited

U.S. PATENT DOCUMENTS

| | | |
|---|---|---|
| 2,248,119 | 7/1941 | Reed et al. |
| 2,692,328 | 10/1954 | Jaye . |
| 2,838,173 | 6/1958 | Emery . |
| 2,990,951 | 7/1961 | Fallert . |
| 3,403,780 | 10/1968 | Binkley et al. |
| 3,708,084 | 1/1973 | Bixler et al. |
| 3,837,560 | 9/1974 | Kuchuris et al. |
| 4,008,916 | 2/1977 | Ide . |
| 4,195,732 | 4/1980 | Bell .................. 206/821 |

FOREIGN PATENT DOCUMENTS

| | | |
|---|---|---|
| 1675329 | 3/1954 | Fed. Rep. of Germany . |
| 1036035 | 8/1958 | Fed. Rep. of Germany . |
| 808474 | 12/1963 | Fed. Rep. of Germany . |
| 1879373 | 7/1964 | Fed. Rep. of Germany . |
| 6927437 | 7/1969 | Fed. Rep. of Germany . |
| 1778881 | 8/1971 | Fed. Rep. of Germany . |
| 2003657 | 8/1971 | Fed. Rep. of Germany . |
| 1097822 | 7/1955 | France . |
| 1392563 | 7/1965 | France . |
| 32859 | 7/1981 | France . |
| 30667 | 2/1904 | Switzerland . |

OTHER PUBLICATIONS

Sinclair–Koppers Company Bulletin, Cover and pp. 13 and 14, No. 9–273, Chapter 3.

*Primary Examiner*—Raul J. Thibodeau
*Attorney, Agent, or Firm*—Flynn, Thiel, Boutell & Tanis

[57] ABSTRACT

A structure for protectively supporting and spacing rolls of web material in a multi-layer stack. The structure includes an elongated member of expandable polystyrene material having a pair of opposed surfaces. A first of the surfaces has a plurality of spaced parallel generally semi-cylindrical indentations disposed to receive rolls of web material. The radius of each of the semi-cylindrical indentations being greater than the depth of the indentation so that the rolls will be snugly retained within indentations in a pair of members and the members will be out of contact with each other. The member has a plurality of cavities located on the lateral edge surfaces thereof extending transversely of the axis of the semi-cylindrical indentation to render the expanded foam material substantially uniformly thick throughout to enhance uniform curing thereof. The cavities extend only partially through the member and in the region located between adjacent recesses, and each of said cavities have side walls which extend parallel to the contour of the outer extremity of the member. Wall segments are provided in the indentations only along one lateral edge of the member.

4 Claims, 9 Drawing Figures

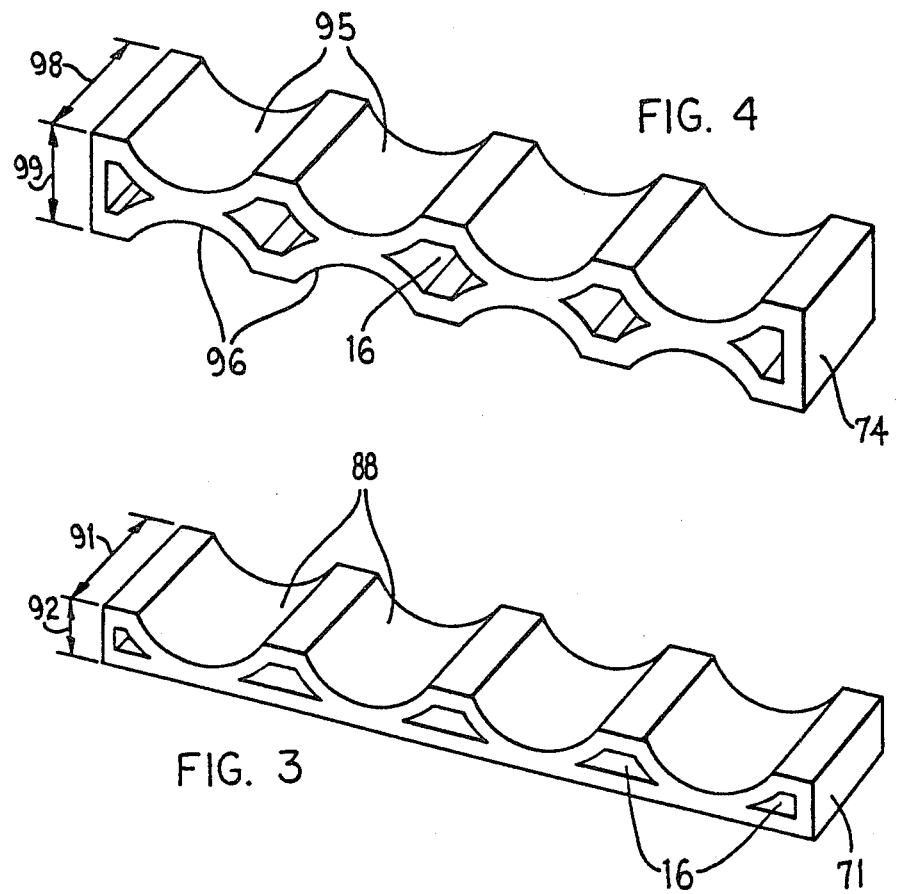

SUPPORTING AND SPACING MEMBER FOR WEB MATERIAL ROLLS

CROSS REFERENCE OF THE INVENTION

This application is a continuation-in-part application of application Ser. No. 235,827, filed Feb. 19, 1981, now U.S. Pat. No. 4,385,091.

FIELD OF THE INVENTION

This invention relates to support members for protectively supporting and spacing a plurality of rolls of material such as cellophane in a multi-layer stack.

BACKGROUND OF THE INVENTION

Certain types of material, such as cellophane, are typically stored and transported in cylindrical rolls. Shipping and storing a plurality of such rolls presents certain disadvantages, however, in that the rolls have limited stability when stood on end and tend to roll if laid on their sides. In addition, when the rolls are of a material such as cellophane which is easily damaged, they require a high degree of protection during shipment.

One approach to solving the foregoing problem is disclosed in U.S. Pat. No. 4,195,732, in which elongated elements having spaced indentations therein are adapted for protectively supporting and spacing a plurality of rolls of cellophane material. The elongated elements are placed between the rolls and a pallet, between stacked layers of the rolls, and on top of the stack, and the stack is then strapped to the pallet. This solution to the problem is relatively effective in practice, but has not been satisfactory in all respects. In particular, it has not proved to be sufficiently cost effective, because individually molding each of the elongated elements is expensive and time consuming.

Further, when the elongated elements are formed with a side wall along one side edge thereof to protect the rolls against damage to the exposed ends of the rolls such as is shown in FIGS. 6 and 7 of U.S. Pat. No. 4,195,732, a problem exists in shipping these elongated elements from the point of manufacture to the point of end use. That is, the lands on the elongated members will not nest within the recesses without first causing one elongated member to become laterally offset relative to another of the elongated members.

Accordingly, it is an object of the present invention to provide elongated members of expanded polystyrene which are adapted for protectively supporting and spacing a plurality of rolls of material such as cellophane in a multi-layer stack and which have an end wall structure adapted to nest within a recess without any need to laterally offset one elongate member relative to an associated other elongate member.

SUMMARY OF THE INVENTION

The foregoing and other objects of the invention are met by providing elongated members which are of two types, one type having a plurality of spaced, transverse grooves on one side thereof, and the other type having a plurality of spaced, transverse grooves on opposite sides thereof.

More specifically the elongated members have a pair of opposed surfaces, one of the surfaces having a plurality of spaced parallel generally semi-cylindrical grooves or indentations disposed to receive rolls of web material, the radius of each of the semi-cylindrical indentations being greater than the depth of the indentations so that the rolls will be snugly retained within indentations in a pair of elongated members and the elongated members will be out of contact with each other. The elongated members further have a plurality of cavities located on the lateral edges thereof extending parallel the axis of the semi-cylindrical indentations and in the lateral edge portion whereat the lands between such indentations are located to render the expanded foam material substantially uniformly thick throughout to enhance uniform curing thereof, said cavities extending transversely of the lengthwise axis of the elongate member only partially through the land portion of said elongated members.

The elongated members further have an upright wall structure along one of said lateral edges and in each indentation, which wall structure is nestable within an indentation and an associated other one of the elongated members.

BRIEF DESCRIPTION OF THE DRAWINGS

Other objects, purposes and advantages of the invention will be apparent to persons acquainted with apparatus of this general type upon reading the following description and inspecting the accompanying drawings, in which:

FIG. 3 is a perspective view of an end member produced according to the present invention;

FIG. 4 is a perspective view of a spacer member produced according to the present invention;

Figure 5:
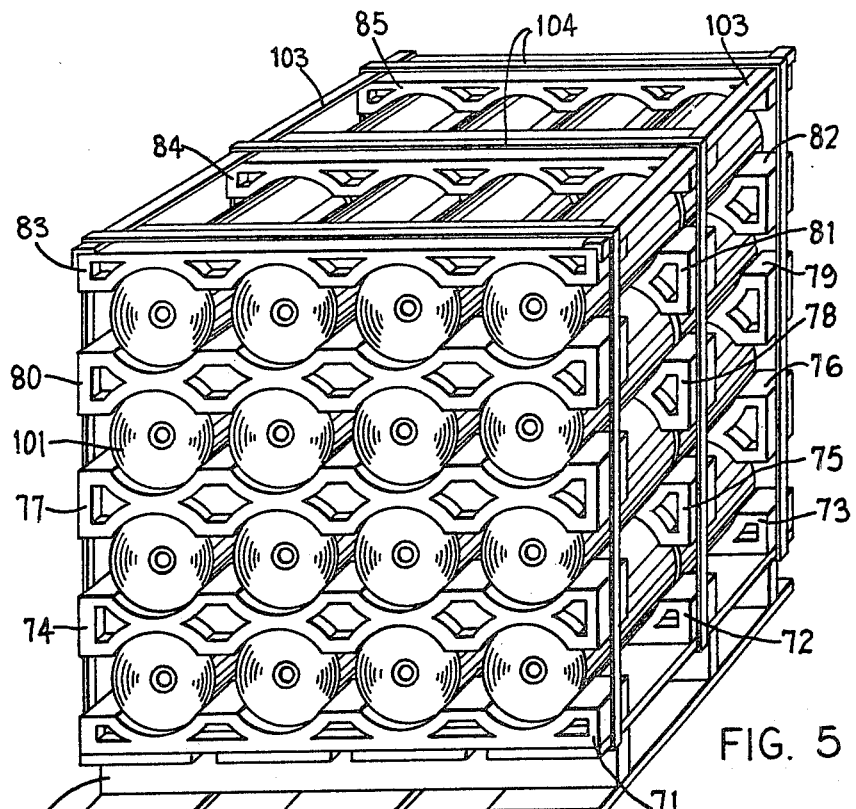
FIG. 5 is a perspective view of a multi-layer stack of rolls supported and spaced on a pallet by the end members and spacer members of the present invention.

Certain terminology will be used in the following description for convenience in reference only and will not be limiting. The words "up" and "down" will designate directions in the drawings to which reference is made. The words "in" and "out" will respectively refer to directions toward and away from the geometric center of an element or device and designated parts thereof. Such terminology will include the words specifically mentioned, derivatives thereof and words of similar import.

DETAILED DESCRIPTION

Figure 1:
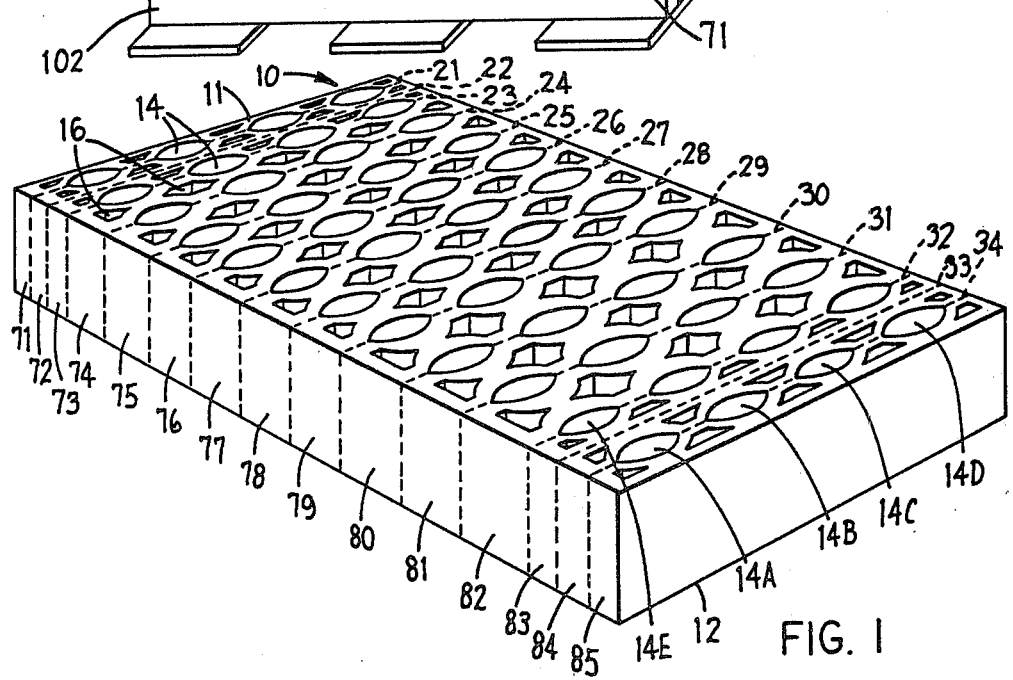
FIG. 1 is a perspective view of the expanded polystyrene sheet of the present invention.

Referring to FIG. 1, a sheet 10 molded from expanded polystyrene in a conventional manner is of generally rectangular shape and has top and bottom surfaces 11 and 12 which extend parallel to each other.

The sheet 10 has a plurality of spaced, parallel openings 14 which extend therethrough from the top surface 11 to the bottom surface 12 and are arranged in parallel rows. In the preferred embodiment of FIG. 1, there are forty-eight openings 14 arranged in twelve rows, each row having four openings 14 and being spaced a substantially uniform distance from adjacent rows. As illustrated in FIG. 1, each of the openings 14 is preferably of substantially elliptical cross section, oriented so that the major axis of the ellipse extends parallel to the rows of openings and the minor axis of the elipse is perpendicular to the rows of openings.

Five shallow cavities 16 are provided in the top surface 11 of the sheet 10 between each pair of adjacent rows of openings 14. The cavities 16 are spaced from the openings 14 and from each other to render the expanded foam material substantially uniformly thick throughout to enhance a more uniform curing during the molding process of the thicker portions of the sheet 10. Similar cavities are provided in the bottom surface 12 in a symmetric fashion. Thus, and as shown in FIG. 1, there are four cavities 16 spaced symmetrically around each opening 14.

Figure 2:
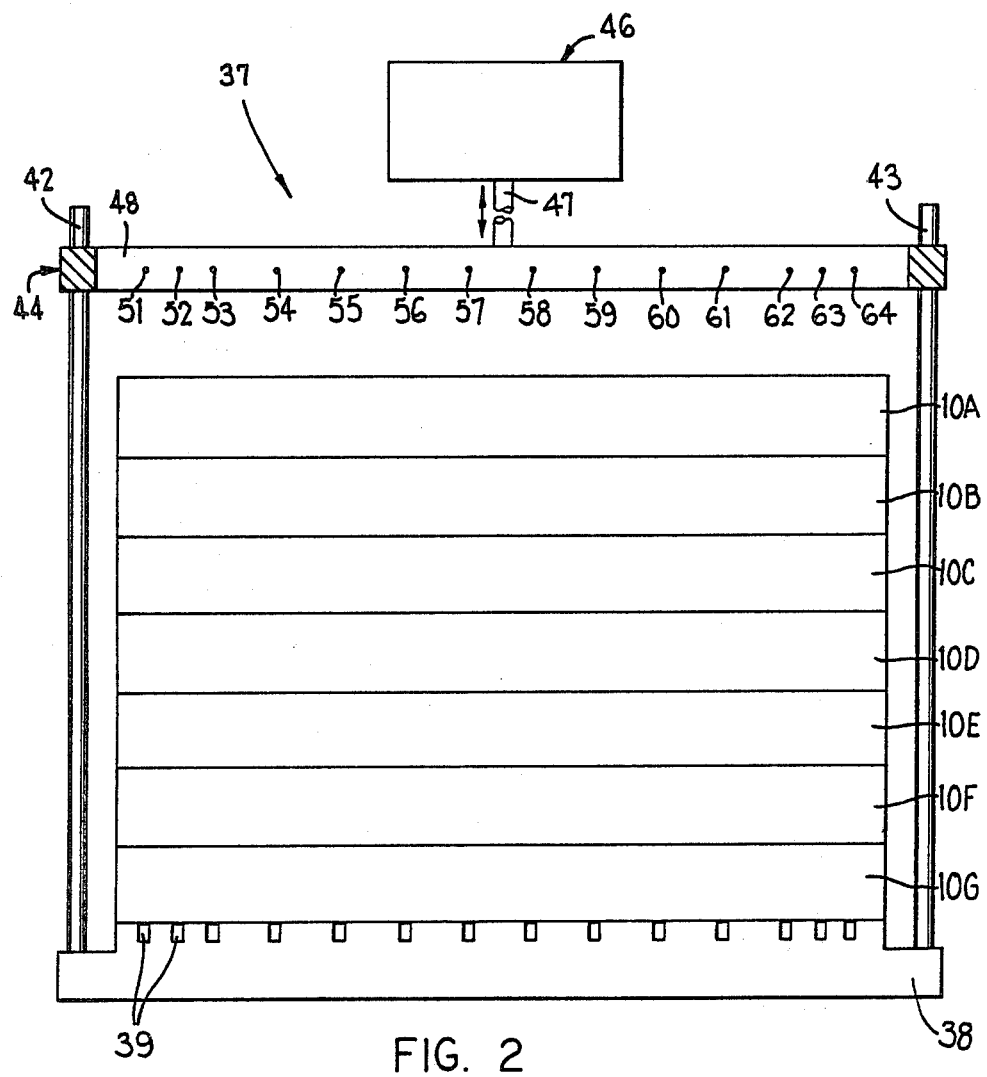
FIG. 2 is a schematic side view of a single grid electric wire cutter.

Referring to FIG. 2, a single grid electric hot wire cutter is designated generally by the reference numeral 37. The wire cutter 37 is of a conventional type and is therefore not described here in extensive detail. The wire cutter 37 has a base 38 with fourteen transversely extending slots 39 in the top thereof. Upright guide members 42 and 43 are mounted to the base 38 at opposite ends thereof and a hot wire grid 44 is slidably supported on the guide members 42 and 43 for reciprocal vertical movement. A drive mechanism 46 of conventional design is operatively connected to the grid 44 by a drive element 47 and effects the reciprocal vertical movement of the grid 44 on the guide members 42 and 43.

The hot wire grid 44 has a pair of spaced and parallel wire support bars 48, one of which is illustrated in FIG. 2. Extending tautly between the wire support bars 48 are fourteen spaced and parallel cutting wires 51-64 which are electrically heated in a conventional manner to a temperature sufficiently hot to quickly melt polystyrene brought into contact with them. The wires 51-64 of the grid 44 and the slots 39 in the base 38 are positioned so that, in the lowermost position of the grid 44, each of the wires 51-64 is received in a respective one of the slots 39.

A vertical stack of seven of the sheets 10, designated in FIG. 2 by the reference numerals 10A-10G, is placed on top of the base 38 beneath the hot wire grid 44. The drive mechanism 46 is then actuated, and acts through the drive element 47 to move the grid 44 downwardly. The two wire support bars 48 pass on opposite sides of the stack 10A-10G and the hot cutting wires 51-64 each melt a path through the sheet 10, thereby dividing each sheet 10A-10G simultaneously into fifteen elongated members. Specifically, the hot wires 51-64 respectively subdivide the sheet 10 along vertical planes which, referring again to FIG. 1, are designated by broken lines and the respective reference numerals 21-34. The sheets 10A-10G are positioned in the wire cutter 37 so that the cutting wires 51, 53-62 and 64 each bisect the surface of each of the openings 14 in a respective row of such openings into two substantially semi-cylindrical portions. The cutting wires 52 and 63 slice through the sheet 10 intermediate the two outermost rows of openings 14 at respective ends of the sheet 10.

The fifteen separate members into which each sheet 10 is subdivided by the fourteen cutting wires 51-64 are designated by reference numerals 71-85 in FIG. 1. The six members 71-73 and 83-85 are end members, and the members 74-82 are spacer members. The end members 71-73 and 83-85 and the spacer members 74-82 are described in greater detail hereinafter.

The end member 71 is illustrated in FIG. 3. End member 71 is elongated and of a generally rectangular shape, and has four spaced, transverse grooves 88 in one side thereof separated by separating walls 89A, the endmost indentations being oriented between a separating wall 89A and an end wall 89B. The grooves 88 are each defined by a substantially semi-cylindrical surface which defined a portion of the surface of one of the openings 14 before the sheet 10 was subdivided. The width 91 of the side having the grooves 88 is preferably greater than or equal to the width 92 of the adjacent side of the member 71, so that the member 71 will be stable in use and will not have a tendency to tip. End members 72, 73 and 83-85 are substantially identical in size and shape to the end member 71 and are therefore not described in detail.

FIG. 4 is an illustration of a spacer member 74. Spacer member 74 is elongated and of generally rectangular shape. Four spaced, transverse recesses or grooves 95 are provided on one side of the member 74, and four spaced, transverse grooves 96 are provided on the opposite side of the member 74, each aligned with a respective groove 95 and each being separated from one another by a separating wall 97A, the endmost indentations being oriented between a separating wall 97A and an end wall 97B. The width 98 of the sides having the grooves 95 and 96 is preferably greater than or equal to the width 99 of the adjacent sides of the member 74, so that the member 74 will be stable in use and not have a tendency to tip over.

FIG. 5 illustrates how thirty-two rolls 101 of a material like cellophane can be stacked on a pallet 102 using the members 71-85. Three end members 71-73 are first placed in a spaced relationship on top of the pallet 102 with the grooves therein facing upwardly. A layer of eight rolls of material 101 is then placed in the grooves in the end members 71-73, four of the rolls being supported by the end members 71 and 72 and the other four being supported coaxial therewith by the end members 72 and 73. Three spacer members 74-76 are then positioned on top of the first layer of rolls 101 and above the end members 71-73, respectively, and a second layer of eight rolls 101 is placed in the upwardly facing grooves of the spacer members 74-76. Two additional layers are then added to the stack in a similar manner, utilizing the remaining rolls 101 and the spacer members 77-82. The end members 83-85 are then placed on the top layer of rolls 101 in a spaced relationship and angle bars 103 are added to protect the edges of the end members 83-85. Metal strapping 104 is then utilized to securely strap the multi-layer stack to the pallet 102 and to stabilize the various layers of the stack.

Figure 6:
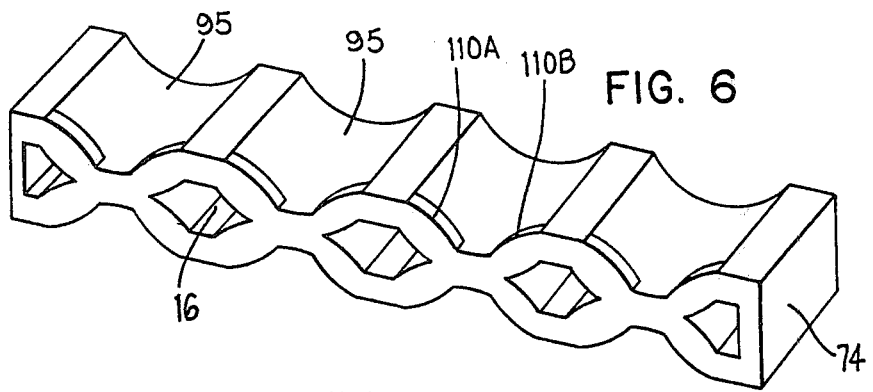
FIGS. 6 and 7 are perspective views of a modified end member and a spacer member.
Figure 7:
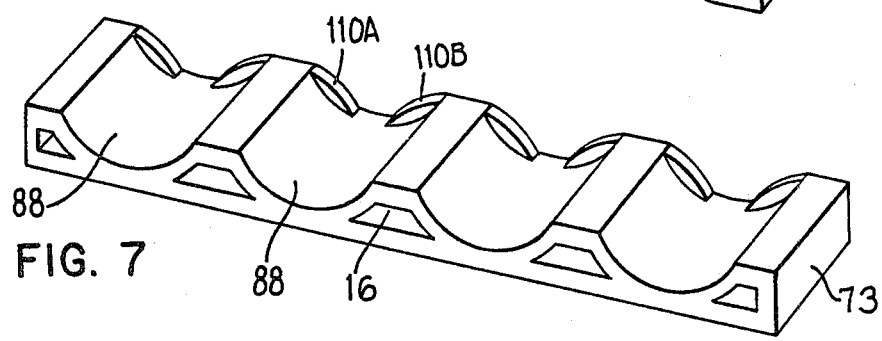
Figure 8:
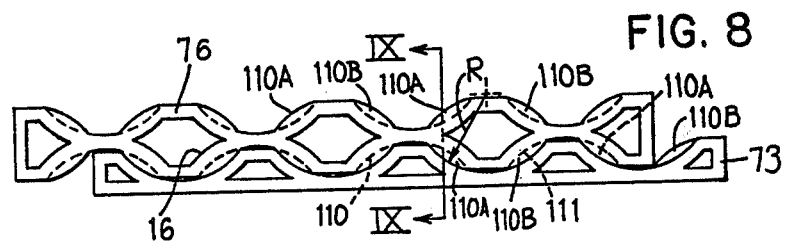
FIG. 8 is an end view of a pair of nested elongated members.
Figure 9:
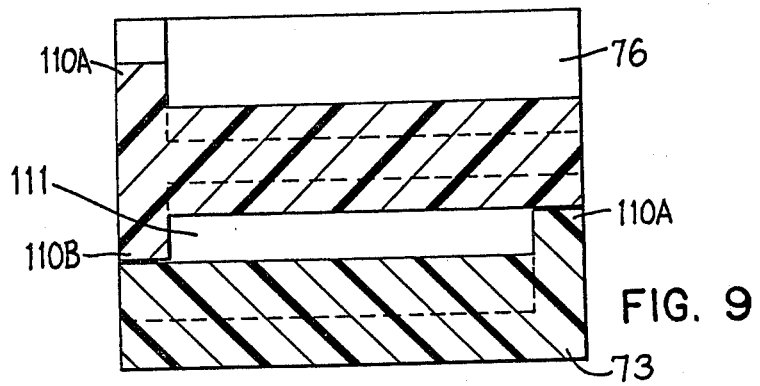
FIG. 9 is a sectional view taken along the lines IX—IX of FIG. 8.

As shown in FIG. 1, the outer end of each roll 101 is preferably spaced inwardly from the outermost side of each of the outermost of the members 71-85 in order to provide increased protection for the rolls 101. It is often desirable, however, to offer additional protection of the rolls by providing a wall structure 110 (FIGS. 6 to 9) in each of the grooves 95, which wall structure has an edge structure shaped to conform with the bottom wall surface of a recess. More specifically, the wall structure 110 is provided only on the members that will be oriented on the outside of the pallet arrangement illustrated in FIG. 5, namely, members 71, 73, 74, 76, 77, 79, 80, 82, 83 and 85. Further, the thickness of the wall structure 110 is generally equal to the wall thickness between the bottom wall of each indentation or groove and the cavities 16. As shown in FIGS. 6 and 7, each wall structure 110 is comprised of two wall segments 110A and 110B, each of which has an arcuate edge structure having a radius R equal to the radius of each groove 95. Thus, when a pair of members are, as shown in FIGS. 8 and 9, shifted lengthwise relative to each other and oriented into a nested array, the wall segments 110A and 110B are received in the grooves 95 so that the arcuate edges thereof occupy the edge of the space 111 that would have otherwise existed between the bottom walls of adjacent grooves had the wall segments 110A and 110B not been present. Thus, of the fifteen members provided, ten would constitute members used on the exposed ends of the rolls and would, therefore, have the aforesaid wall segments thereon.

The nestability feature of the wall segments in the grooves provided an unexpected high percentage increase in the space available for product in a vehicle utilized for shipping product from the point of manufacture to the point of end use, that is, the shipper of rolled material. It has been estimated that the extra space caused by the nesting feature enables the shipment of 35 percent more product in the same space.

Although particular preferred embodiments of the invention have been disclosed in detail for illustrative purposes, it will be recognized that minor variations or modifications thereof lie within the scope of the present invention.

The embodiments of the invention in which an exclusive property or privilege is claimed are defined as follows:

1. In a structure for protectively supporting and spacing rolls of web material in a multi-layer stack, comprising an elongated member of expanded polystyrene material having a pair of opposed surfaces, a first of said surfaces having a plurality of spaced, parallel, generally semi-cylindrical indentations disposed to receive rolls of web material, said indentations being separated by separating walls, the endmost indentations being oriented between a separating wall and an end wall, the radius of each of said semi-cylindrical indentations being greater than the depth of said indentation, whereby the rolls will be snugly retained within the indentations in a pair of members and the members will be out of contact with each other, the improvement comprising wherein at least one upright and spaced wall segment is provided in each said indentation along one lateral edge of said elongated member and between said separating walls and associated end walls, each said wall segment having an arcuate edge with a radius opposite the radius of said semi-cylindrical indentation and conforming to the radius of a respective indentation in an adjacent member thereby enabling, upon a lengthwise shifting of one member relative to said adjacent member, said wall segment in one indentation to be received in the indentation of said adjacent member upon a nesting thereof and without any lateral offset of said one member relative to said adjacent member.

2. The structure of claim 1, wherein said elongated member has a plurality of cavities located in each of the lateral edge surfaces thereof extending parallel to the axis of said semi-cylindrical indentations to render said expanded foam material substantially uniformly thick throughout to enhance uniform curing thereof, said cavities extending only partially through the member and in the region located between adjacent indentations, each of said cavities have sidewalls which extend parallel to the contour of the outer extremity of said member.

3. The structure of claim 2, wherein a single cavity exists between each semi-cylindrical recess and is oriented symmetrically therebetween.

4. The structure of claim 1, wherein a pair of upright and spaced wall segments is provided in each said indentation along said one lateral edge of said elongated member, each side wall segment having a said arcuate edge conforming to the radius of a respective indentation in said adjacent member thereby enabling, upon a lengthwise shifting of one member relative to said adjacent member, said wall segments in one indentation to be received in the indentation of said adjacent member upon a nesting thereof and without any lateral offset of said one member relative to said adjacent member.

* * * * *

UNITED STATES PATENT AND TRADEMARK OFFICE
CERTIFICATE OF CORRECTION

PATENT NO. : 4,435,463

DATED : March 6, 1984

INVENTOR(S) : Thomas A. Roellchen

It is certified that error appears in the above-identified patent and that said Letters Patent is hereby corrected as shown below:

The title page showing the illustrative figure and Figs. 3, 4, 6 and 7 should be deleted to appear as per attached pages.

United States Patent [19]

Roellchen

[11] 4,435,463
[45] Mar. 6, 1984

[54] SUPPORTING AND SPACING MEMBER FOR WEB MATERIAL ROLLS

[75] Inventor: Thomas A. Roellchen, Almena Township, Van Buren County, Mich.

[73] Assignee: Ace Polymers, Inc., Kalamazoo, Mich.

[21] Appl. No.: 385,360

[22] Filed: Jun. 7, 1982

Related U.S. Application Data

[63] Continuation-in-part of Ser. No. 235,827, Feb. 19, 1981, Pat. No. 4,385,091.

[51] Int. Cl.³ .................. B32B 3/26; B65D 85/67; B65D 85/62
[52] U.S. Cl. .................. 428/158; 108/901; 206/391; 206/386; 206/821; 428/156; 428/167; 428/174; 428/188; 428/192
[58] Field of Search .......... 428/156, 158, 188, 131, 428/192, 167, 174; 108/901, 51.1; 248/346; 206/821, 386, 391

[56] References Cited

U.S. PATENT DOCUMENTS

| | | |
|---|---|---|
| 2,248,119 | 7/1941 | Reed et al. |
| 2,692,328 | 10/1954 | Jaye |
| 2,838,173 | 6/1958 | Emery |
| 2,990,951 | 7/1961 | Fallert |
| 3,403,780 | 10/1968 | Binkley et al. |
| 3,708,084 | 1/1973 | Bixler et al. |
| 3,837,560 | 9/1974 | Kuchuris et al. |
| 4,008,916 | 2/1977 | Ide |
| 4,195,732 | 4/1980 | Bell ............ 206/821 |

FOREIGN PATENT DOCUMENTS

| | | |
|---|---|---|
| 1675329 | 3/1954 | Fed. Rep. of Germany |
| 1036035 | 8/1958 | Fed. Rep. of Germany |
| 808474 | 12/1963 | Fed. Rep. of Germany |
| 1879373 | 7/1964 | Fed. Rep. of Germany |
| 6927437 | 7/1969 | Fed. Rep. of Germany |
| 1778881 | 8/1971 | Fed. Rep. of Germany |
| 2003657 | 8/1971 | Fed. Rep. of Germany |
| 1097822 | 7/1955 | France |
| 1392563 | 7/1965 | France |
| 32859 | 7/1981 | France |
| 30667 | 2/1904 | Switzerland |

OTHER PUBLICATIONS

Sinclair-Koppers Company Bulletin, Cover and pp. 13 and 14, No. 9-273, Chapter 3.

Primary Examiner—Raul J. Thibodeau
Attorney, Agent, or Firm—Flynn, Thiel, Boutell & Tanis

[57] ABSTRACT

A structure for protectively supporting and spacing rolls of web material in a multi-layer stack. The structure includes an elongated member of expandable polystyrene material having a pair of opposed surfaces. A first of the surfaces has a plurality of spaced parallel generally semi-cylindrical indentations disposed to receive rolls of web material. The radius of each of the semi-cylindrical indentations being greater than the depth of the indentation so that the rolls will be snugly retained within indentations in a pair of members and the members will be out of contact with each other. The member has a plurality of cavities located on the lateral edge surfaces thereof extending transversely of the axis of the semi-cylindrical indentation to render the expanded foam material substantially uniformly thick throughout to enhance uniform curing thereof. The cavities extend only partially through the member and in the region located between adjacent recesses, and each of said cavities have side walls which extend parallel to the contour of the outer extremity of the member. Wall segments are provided in the indentations only along one lateral edge of the member.

4 Claims, 9 Drawing Figures

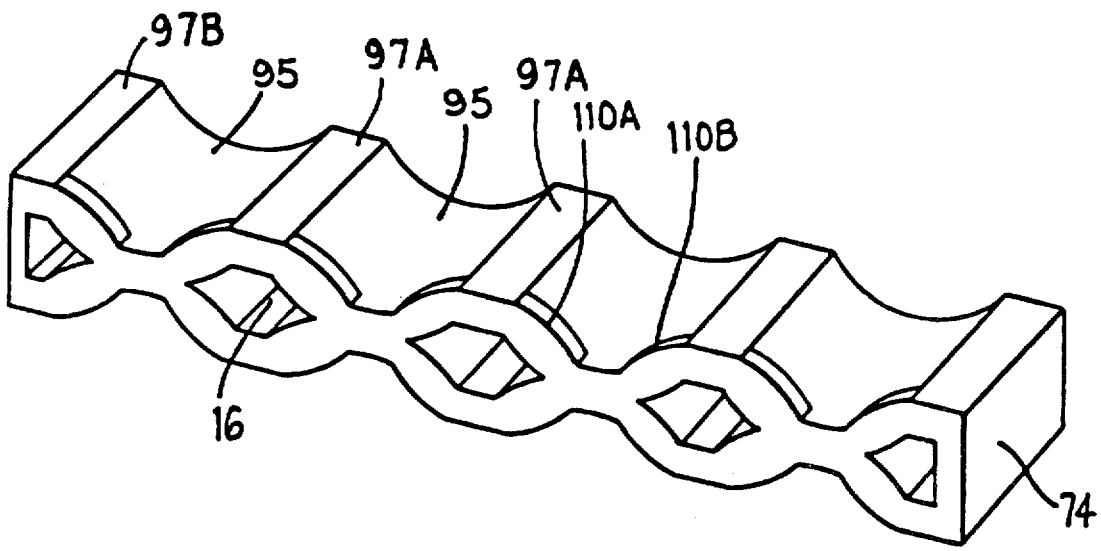

UNITED STATES PATENT AND TRADEMARK OFFICE
CERTIFICATE OF CORRECTION

PATENT NO. : 4,435,463  
DATED : March 6, 1984  
INVENTOR(S) : Thomas A. Roellchen Page 3 of 5

It is certified that error appears in the above-identified patent and that said Letters Patent is hereby corrected as shown below:

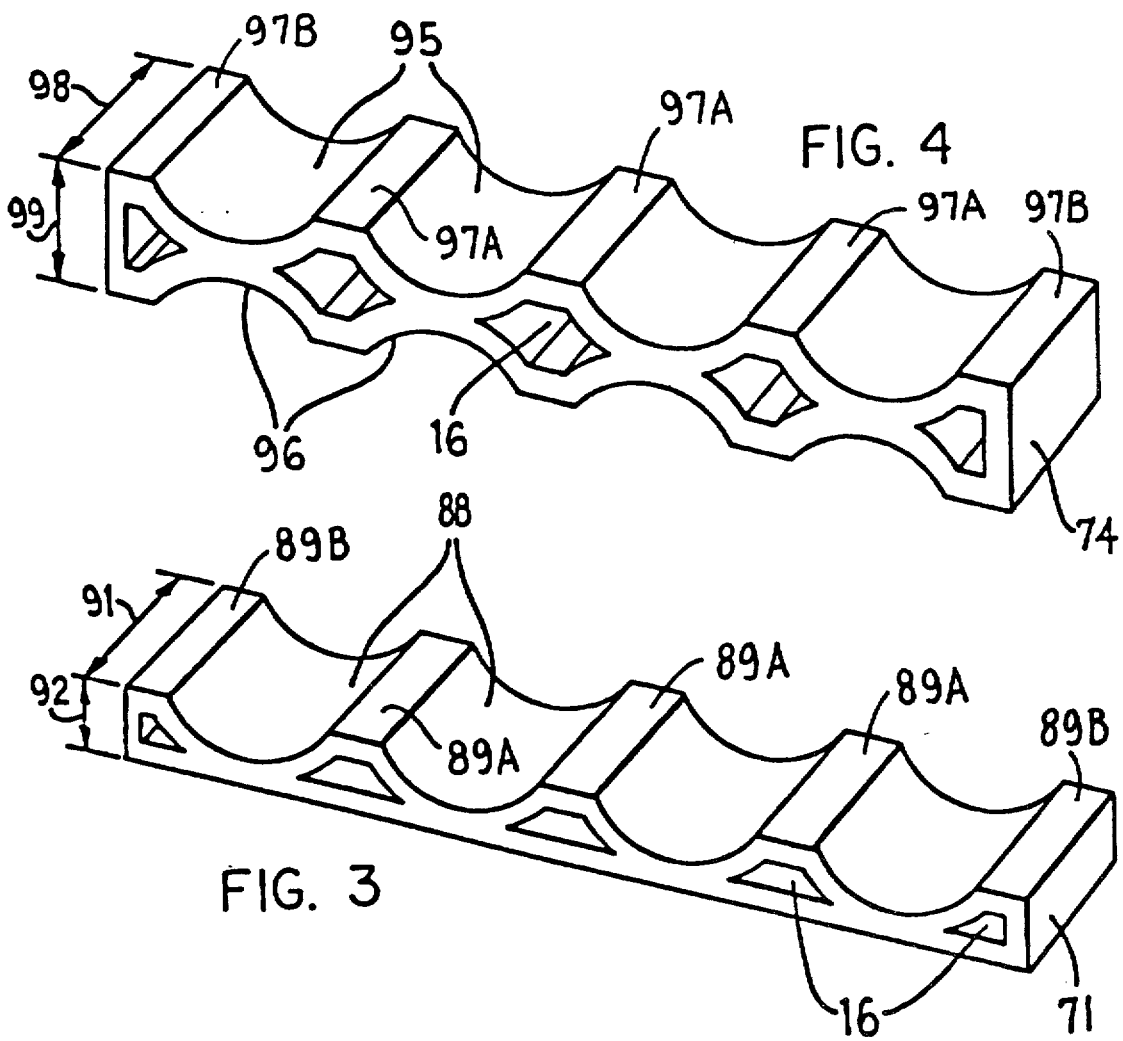

UNITED STATES PATENT AND TRADEMARK OFFICE
CERTIFICATE OF CORRECTION

PATENT NO. : 4,435,463
DATED : March 6, 1984
INVENTOR(S) : Thomas A. Roellchen

It is certified that error appears in the above-identified patent and that said Letters Patent is hereby corrected as shown below:

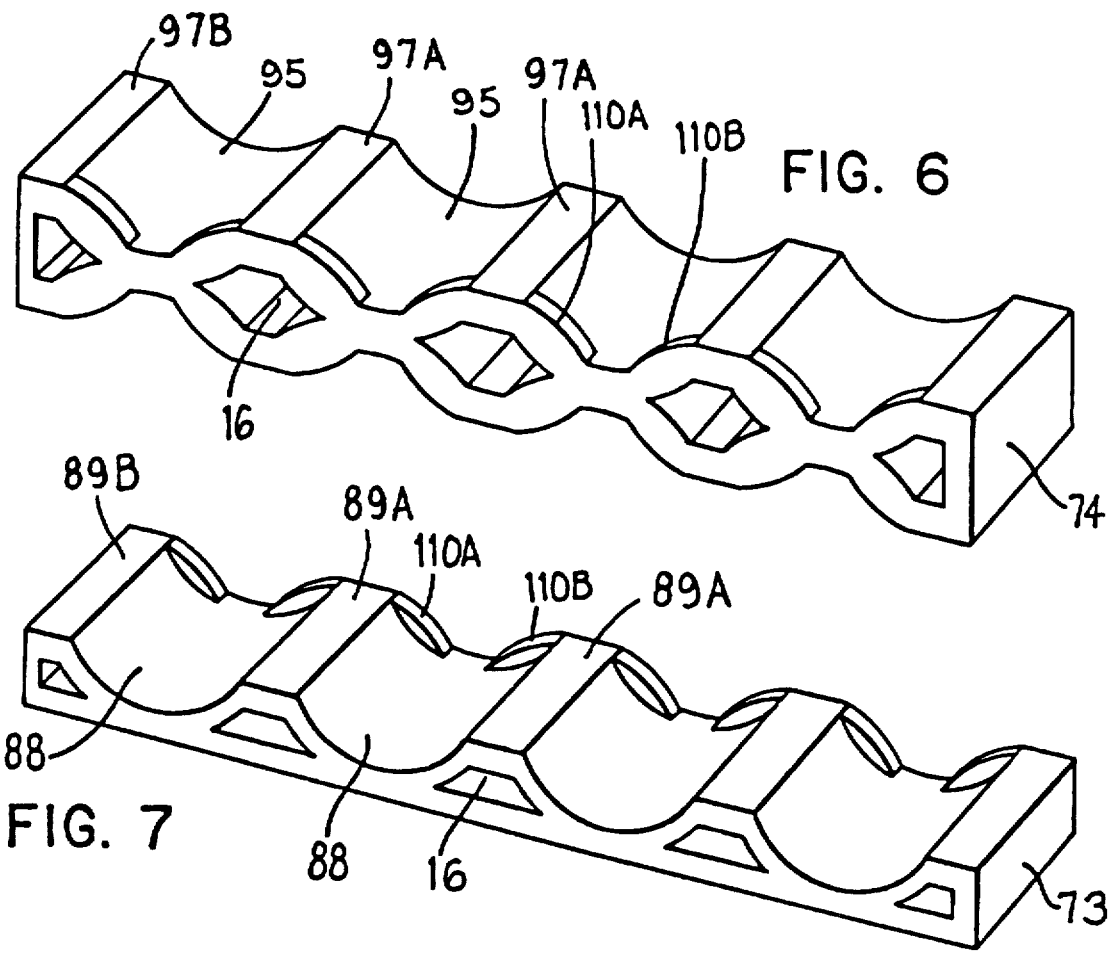

UNITED STATES PATENT AND TRADEMARK OFFICE
CERTIFICATE OF CORRECTION

PATENT NO. : 4,435,463                      Page 5 of 5

DATED : March 6, 1984

INVENTOR(S) : Thomas A. Roellchen

It is certified that error appears in the above-identified patent and that said Letters Patent is hereby corrected as shown below:

Column 6, line 33; change "side" to ---said---.

Signed and Sealed this

Tenth Day of July 1984

[SEAL]

Attest:

GERALD J. MOSSINGHOFF

Attesting Officer        Commissioner of Patents and Trademarks